W. CROSSLEY & T. D. ADAMS.
NON-REFILLABLE BOTTLE.
APPLICATION FILED FEB. 17, 1911.
1,014,127.
Patented Jan. 9, 1912.
2 SHEETS—SHEET 1.
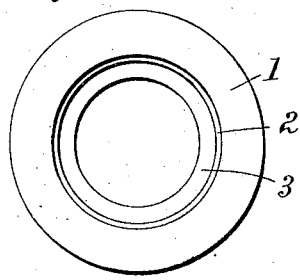
Fig. 2
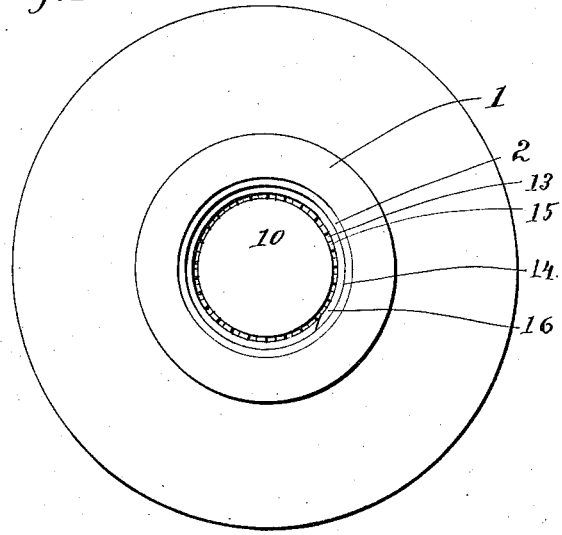
Fig. 1
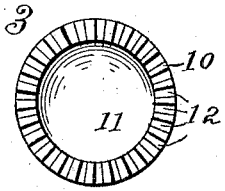
Fig. 3
Fig. 4
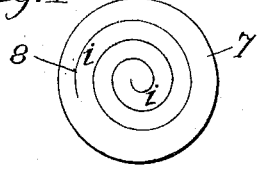
Fig. 5
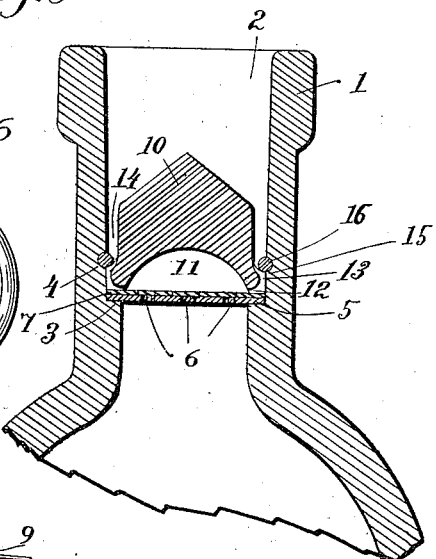
Fig. 6
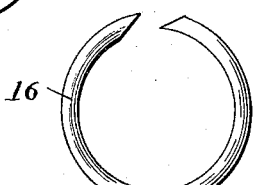
Fig. 7
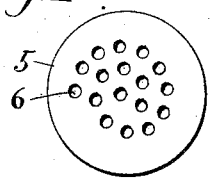
Fig. 8
WITNESSES
Linus Barnes
Willis Barnes
INVENTORS
William Crossley, and
Thomas D. Adams,
By George L. Barnes
Attorney W. CROSSLEY & T. D. ADAMS.
NON-REFILLABLE BOTTLE.
APPLICATION FILED FEB. 17, 1911.

1,014,127.

Patented Jan. 9, 1912.

2 SHEETS—SHEET 2.

WITNESSES

INVENTORS
William Crossley and
Thomas D. Adams,
By George L. Barnes Attorney

UNITED STATES PATENT OFFICE.

WILLIAM CROSSLEY AND THOMAS D. ADAMS, OF WEST HAVEN, CONNECTICUT.

NON-REFILLABLE BOTTLE.

1,014,127.         Specification of Letters Patent.         Patented Jan. 9, 1912.

Application filed February 17, 1911. Serial No. 609,130.

*To all whom it may concern:*

Be it known that we, WILLIAM CROSSLEY and THOMAS D. ADAMS, citizens of the United States of America, and residents of West Haven, in the town of Orange, in the county of New Haven and State of Connecticut, have invented certain new and useful Improvements in Non-Refillable Bottles, of which the following is a specification.

Our invention relates to a non-refillable bottle, and it has for its object to provide a bottle stopping device which when applied to a bottle or similar vessel will absolutely prevent the entrance of liquids into the bottle, and render it impossible to refill the bottle after it is once emptied of its original contents introduced before the application of the stopper, without visible damage to the parts and evidence of fraud.

The invention consists in the bottle stopping device, its novel valve, the novel securing mechanism, the configuration of the bottle, and the novel combination, arrangement and construction of parts as hereinafter more fully described and claimed.

Figure 9:
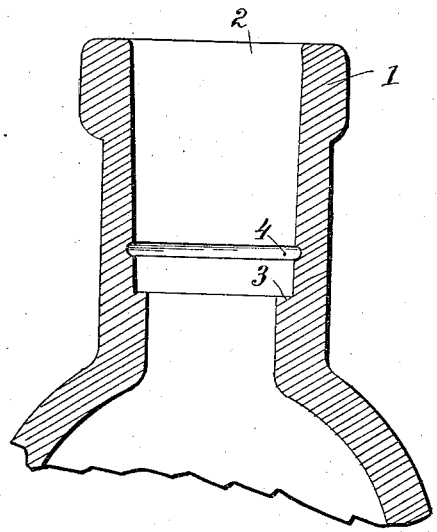
Figure 10:
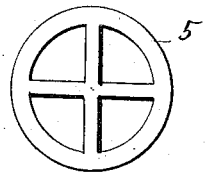
Figure 11:
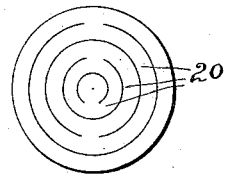

In the accompanying drawings forming a part of this specification, Figure 1 is a plan view of a bottle embodying our bottle stopping device, viewed as looking into the mouth or neck of the bottle. Fig. 2 is a similar view of the mouth of the bottle with the stopping devices removed. Fig. 3 is a view of the lower side of the valve protecting guard. Fig. 4 is a plan view of the valve shown closed. Fig. 5 is a central vertical section through Fig. 1. Fig. 6 is a plan view of the automatic holding ring. Fig. 7 is a plan view of the valve supporter. Fig. 8 is an edgewise elevation of the valve shown open. Fig. 9 is a sectional view similar to Fig. 5 with the stopping devices removed. Fig. 10 is a modification of the valve support. Fig. 11 is a modification of the valve.

Referring to the drawings 1 designates the neck of a bottle equipped with our novel stopping mechanism, and 2 denotes the mouth or opening into the bottle. Said mouth is made slightly tapering or contracted inwardly for a sufficient distance to receive an ordinary cork, and for a certain distance downward in addition, to an annular shoulder 3 having its surface or seat substantially square with the sides of the neck or transverse thereto as shown in Fig. 5. The shoulder is formed by the thickening of the walls of the neck inwardly, and reduction of the caliper of the opening below the shoulder. A groove 4, shown of semicircular cross section in Figs. 5 and 9, is formed in the neck a short distance above the shoulder passing entirely around the inside thereof in a plane at right angles to the axis of the neck.

Seated upon the shoulder 3 is a disk 5 forming a valve support, shown having a series of perforations 6 through it in Fig. 7, but which may comprise a simple ring with cross bars as shown in Fig. 10. Said device supports a valve 7 resting upon it, which comprises a thin disk of elastic material such as spring sheet steel, of the diameter of the support 5, having a spiral line of cleavage 8 winding from a point coincident with the inside circumference of the neck of the bottle below the shoulder 3 in several convolutions to the center field of the disk, thus providing a spiral tongue of the length of said line. Said tongue, owing to its great length is capable of great flexibility and its end or central part of the disk can be readily distended upwardly to a comparatively great distance above the flat plane of the disk or surface of the valve supporter 5, to which it will automatically return by virtue of its elasticity or spring tension, and by the action of gravity when the bottle is in the upright position. Such distention of the valve tongue, as illustrated in Fig. 8 provides an opening or space 9 between the respective convolutions of the coil vertically through which the contents of the bottle can readily flow and escape from the bottle, the slight pressure of such contents when the bottle is tipped from the vertical position, and the action of gravity being sufficient to distend the valve and allow the fluid to escape. But unless the valve is distended, and while it remains in the flat disk form, the edges of the convolutions of the tongue impinge against each other, forming a liquid tight joint, and in such position the valve acts as a solid disk of metal which seals the bottle against the entrance of liquid from the outside, though readily distending and permitting the flow of liquid from the interior outwardly.

Above the valve is fitted the valve guard 10, having the diameter of the mouth of the bottle at its lower edge and fitting snugly within the same, with its circular edge resting upon the corresponding edge of the valve over the edge of the valve support and the annular shoulder 3. On the lower side of the guard is the dome shaped recess 11 of the diameter of the opening through the neck of the bottle below the shoulder. Said recess provides the necessary space for permitting the distention of the valve upwardly, and the annular seating surface at the edge of the guard around said recess is notched to provide the radial channels 12 from the recess to the outer vertical side of the guard. Said outer vertical side, as far as it conforms to the bore of the mouth of the bottle is also corrugated to provide the vertical channels 13 in continuation of those on the annular face which rests on the valve. The height of the said vertical surface of the guard having the channels 13 is such as to provide the required strength of material around the lower part of the dome shaped space 11, and above such plane, the guard is reduced in diameter to provide an annular space 14 between it and the bore of the mouth of the bottle. Said height is the factor that determines the position of the groove 4, which is located at the bottom of the space 14, with its lower edge slightly below the shoulder 15 formed by the reduction of diameter of the upper part of the guard from that of its lower edge. The annular space 14 around the upper part of the guard is proportioned to just receive a split ring 16 of elastic material such as spring steel, normally expanded from the position in which its ends are in contact, are shown in Fig. 6. With the remaining parts of the stopping device in place, the ring in operation may be inserted into and pushed down the tapering mouth of the bottle, around the guard and into the space 14 down to the bottom thereof, where, by means of its tension induced by having been sprung into the neck of the bottle, it will expand into the groove 4 and force the guard, valve, and valve support down upon the shoulder 3, and securely hold the parts in place. With the ring once in place in the groove 4 it is impossible of removal, and consequently the remaining parts of the mechanism can not afterward be tampered with. The depth of the space 14 is such that a pointed tool can not be employed to remove the ring, and the top of the guard is preferably made conical to hinder attempts at drilling through the guard. The guard may be made of glass or similar material, and its strength can be made sufficient to insure breakage of the neck of the bottle before it would yield to a forcible attempt to dislodge it.

In operation, the valve and accompanying parts are to be placed in the bottle after the same is filled, then, after the original contents are emptied, to which process the valve offers no obstruction, the valve will absolutely prevent the refilling of the bottle, as fully hereinbefore described.

It will readily be perceived that a form of valve of other or ordinary construction may be used in connection with the guard and the automatic ring, but the use of the valve described is of great importance and its construction is particularly adapted to its use in bottle stopping mechanism. It does not necessarily require to operate in combination with a seat, the essential function of the part 5 being to prevent the distention of the valve inwardly. The perforations in the support for the egress of fluid may follow the course of the tongue of the valve, which then practically seats itself upon them, or they may not do so, as the impingement of the edges of the convolutions of the valve against one another makes the joints tight, the device operating as a solid disk when closed. Thus it may be used in connection with the cross barred form of the support shown in Fig. 10. The form of the valve may also be varied without departing from the principle of the invention, as for instance, as shown in Fig. 11 in which a series of rings 20 are formed one within the other by lines of cleavage at their meeting edges, each being joined to the next adjacent ring alternately on opposite sides of the center. This provides great length between the free end or center of the system, and the fixed end thereof, providing great flexibility of the part as hereinbefore described.

We claim as our invention:

1. In a non-refillable bottle the combination of a bottle provided with an annular shoulder in its mouth and a groove above the shoulder, a valve support resting upon the shoulder, a valve resting upon the shoulder above the support a guard, comprising a vertical central cylindrical body recessed on its lower side for the lift of the valve, and a flange at the bottom supported by the shoulder above the support and valve, having channels from the recess around to the upper surface of the flange, and an expansible ring received in the groove of the neck projecting upon and holding the guard flange with the openings of the channels interior thereto, the said body of the guard being reduced in caliper from the bore of the neck to just provide for the passage of the ring in being inserted to place, and the annular space thus provided serving for the outward flow of the liquid from the bottle after passing around the flange and interior to the ring.

2. In a non-refillable bottle the combination of a bottle provided with an annular shoulder, a valve support supported by the shoulder, a valve supported above the support comprising a disk cut by a spiral line of cleavage to form a spiral flap or tongue, a guard supported above the valve having a central recess on its lower side for the upward lift of the valve, and channels from the recess to the periphery of its lower part, and corresponding channels in said periphery opening above the valve, and an expansible ring received in the groove of the bottle projecting over and engaging the guard to hold it upon its seat.

3. A valve comprising a plate cut by a line of cleavage into a spiral scroll the convolutions of which have their edges in contact to form a tight joint when in their original form, but are separable by distention of the convolutions from such form to permit the flow of fluid between them.

4. A valve comprising a plate cut by a line of cleavage into folds having their edges in contact to form a tight joint in their original form but capable of distention to separate their edges for the flow of a fluid.

5. In a non-refillable bottle the combination of a bottle having an annular shoulder in its mouth, a valve support seated upon the shoulder having a spiral line of perforation, a valve seated upon the support having a spiral flap covering the perforations of the support, a guard supported above the valve provided with a recess for the lift of the valve and channels from the recess around the edge of the guard to its outer surface, and a ring expanded by its spring tension into the groove of the bottle in engagement with the upper side of the guard to hold the same in place.

Signed by us at West Haven this 26th day of January 1911.

WILLIAM CROSSLEY.
THOMAS D. ADAMS.

Witnesses:
GEORGE L. BARNES,
GEORGE H. THOMAS.

---

Copies of this patent may be obtained for five cents each, by addressing the "Commissioner of Patents, Washington, D. C."